United States Patent Office 2,844,557
Patented July 22, 1958

2,844,557

POLYHALOCARBON COATING COMPOSITION

Pierre R. Welch, Washington, D. C.

No Drawing. Original application February 9, 1954, Serial No. 409,267, now Patent No. 2,777,783, dated January 15, 1957. Divided and this application October 22, 1956, Serial No. 617,661

9 Claims. (Cl. 260—43)

This invention relates to a coating composition for coating a surface to be protected from corrosion, employing a dispersion of a fusible resin which is substantially insoluble in known solvents, in admixture with a second resin. More particularly it relates to coatings of the baked-film type comprising a polyhalocarbon resin and a non-polyhalocarbon resin compatible therewith and capable of withstanding fusion temperatures of the polyhalocarbon resin, said coating being built up by applying to a surface to be protected, an initial layer or layers containing from 0% to about 70% of polyhalocarbon resin and applying successive layers of progressively increasing polyhalocarbon resin content to a final layer containing about 70% to 100% of fused polyhalocarbon resin.

In relatively recent years a group of polymers have been developed which have come to be known as polyhalocarbons. These have been made by forming polymers of halocarbon compounds having an ethylenic linkage wherein the hydrogen has been completely replaced by fluorine, or by fluorine and chlorine, fluorine and bromine, fluorine and iodine or any combinations of one or more atoms of fluorine with one or more of the other halogens. The methods of making such polyhalocarbon resins are well known and include straight polymerization of halogen-substituted ethylenes or the like. These have been further modified in certain instances by treating the polymers pyrolytically; and by treatment of polyhalocarbon polymers with fluorinating or other halogenating agents.

Dispersions or suspensoids of polyhalocarbon resins of substantially colloidal size have been prepared, generally by grinding in water or various organic liquids, as the suspending medium. These have been used to bake-coat various surfaces particularly metal such as steel, steel alloys, aluminum, etc. The suspensions are applied in successive layers, being dried to remove the suspending medium and then prebaked at a temperature at or above the melting point of the polyhalocarbon resin after each layer is applied. A final bake is given for a longer period of time after the final layer is applied in order to completely fuse the multiple coats applied thereon.

Although the polyhalocarbon polymers have many desirable characteristics such as a high dielectric strength, imperviousness to water, and the best resistance to corrosive materials such as acids, alkalies and the like, of any resin known, they are subject to several disadvantages which has limited their use as coating agents except in certain special instances. They have the disadvantage that the bond formed with the surface to be coated, whether it be metal, ceramic ware, or over another resin, is either non-existent or extremely weak, as witness U. S. Patent 2,562,117. Because they are insoluble in known solvents, and hence must be applied as suspensoids, they have poor covering properties and will not cover irregular surfaces such as rough weld seams, crevices, apertures or pits in the surface, or seams resulting from two pieces of metal meeting at an angle. They will not cover sharp edges and corners, having a tendency to "crawl" or pull away. If applied in too thick coats, they tend to "mud-crack." Because of the poor bond, films consisting of polyhalocarbon resins are more like an "envelope" than a true coating having a good bond. Thus if a coating is imperfect, or if it is scored or scratched or otherwise damaged so that the metal is exposed, any corrosive fumes or solutions which come in contact therewith "creeps" between the film and the coated surface and substantially all of the bond is lost to such an extent that it may float away or can be lifted from the coated surface. Thus, it may be seen utility as coatings is limited to smooth, regular surfaces of articles that can be coated perfectly without a break and which in service is not likely to be damaged to the point of film penetration. Another disadvantage of the polyhalocarbon resins is their high cost compared with other commercially available bake-type coating resins.

Some of the polyhalocarbon resins such as du Pont's Teflon (polytetrafluoroethylene) require a baking temperature of from about 680° to about 750° F. Others such as polytrifluoro-chloroethylene (Kellogg's Kel. F) have the advantage that lower baking temperatures of about 435° to about 485° F. may be used. Pre-baking time at these temperatures are about 45 to 60 minutes for the individual coats, with a five hour final-bake.

It is an object of the present invention to produce a coating having the advantages of the polyhalocarbon resins with respect to moisture impermeability, corrosion resistance, high dielectric strength and other desirable properties, while at the same time overcoming the disadvantages hereto encountered.

In one specific embodiment the invention comprises a coating composition comprising a uniform fluid dispersion of a normally solid polyhalocarbon resin in which the halogen atoms are fluorine and at least one halogen atom other than fluorine, the dispersed particles of said resin having a size of less than about three microns, the dispersion medium being a non-aqueous organic liquid, a non-polyhalocarbon extender resin dissolved in an organic solvent, said polyhalocarbon resin comprising about 5% to about 70% by weight and the non-polyhalocarbon resin comprising about 95% to about 30% by weight of the total resin content of said composition, said extender resin being compatible with said polyhalocarbon resin and being capable of withstanding the temperature and time necessary to fuse said polyhalocarbon resin to a coherent film. The preferred polyhalocarbon resin is polytrifluorochloroethylene.

The polyhalocarbon resins which may be employed in my invention include the polymers of halocarbons such as the halogen-substituted ethylenes, for example, polytrifluorochloroethylene, polydifluoro - dichloroethylene, and similar resins wherein one or both of the chlorine atoms is replaced with another halogen such as bromine or iodine; poly-polyhalocyclobutenes such as pentafluorochlorocyclobutene, tetrafluorodichlorocyclobutenes and the like; the pyrolysis products of unsaturated fluorochloroethylenes such as trifluorotrichloroethylene, etc. Many of these compounds and methods of preparing them are disclosed in U. S. patent 2,531,134. It will be noted that they contain fluorine and at least one atom of a halogen other than fluorine.

The polyhalocarbon resins useful in the invention may be those which have been condensed or polymerized to an extent such that they are normally solid and can be dispersed in liquid medium such as various organic suspending agents such as xylene, naphthenes, etc., usually by grinding in the presence of the suspending agent to a particle size of about 0.1 to 3 microns, most of the particles being about 1 micron in size. Methods of forming the suspensions are well known and need not be described in detail since they form per se, no part of my invention.

The added resins which for convenience I refer to as "extended" resins, must have the following characteristics:

(1) They must be capable of forming a strong bond with the surface to be coated.

(2) They must be capable of withstanding baking temperatures at or above the fusing temperature of the polyhalocarbon resin for the time requisite for carrying out the various baking steps, these temperatures usually ranging upward from 400° F. depending upon the type of polyhalocarbon resin used. They must not decompose or volatilize, or otherwise deteriorate at these temperatures. The thermosetting resins suitable for use in this invention cure at or below such temperatures. Suitable thermoplastic resins fuse at or below such temperatures.

(3) They must be compatible with the polyhalocarbon resin and with the polyhalocarbon resin suspensions. By compatibility it is meant that the extender resin must be soluble in or capable of forming dispersions in liquid media in which 5% to 70% of the resin content is dispersed polyhalocarbon resin, said dispersion being stable, and homogeneous, i. e., one which will not gel, flocculate, settle out or otherwise change phase so as to prevent application of the final suspension to the surface to be coated. It must also be substantially unreactive with the polyhalocarbon resins, at least to the extent that any reaction occurring will not destroy the desired properties of either the added resin or the polyhalocarbon resin, either under the conditions at which the dispersions are made, or during formation of the coating, including the baking steps.

(4) The extender resin should be of the kind that has good spreading and flow-out characteristics in a coating composition, being capable of bridging small apertures, holes, pits, seams, etc. and of retaining such properties after being admixed with the polyhalocarbon resins.

(5) If thermosetting, they are used in the initial mixtures in the uncured form. If thermoplastic they should preferably be high polymers requiring high baking temperatures.

(6) The extender resins should have corrosion resisting properties in and of themselves.

Specific types of extender resins which may be used are as follows:

GROUP A

This group of extender resins are the condensation polymers of epichlorohydrin and bisphenol. These resins, a number of which are produced by the Shell Chemical Corporation and known as Epon resins, are high molecular weight solids. Resins of this type are available commercially from other manufacturers. Modified Epon resins may be used by esterifying with high molecular weight ($C_{18}$) fatty acids; resin acids; polybasic acids such as phthalic, maleic, sebaccic, etc., and other modifying agents. Both modified and unmodified Epon resins are useful in the present invention provided they meet the above listed qualifications. Most of these are heat curing resins.

GROUP B

This group comprises the phenolic resins which are condensation products of a phenol or an alkylated phenol, for example, butylphenol, cresol, resorcinol and the like, with aldehydes such as formaldehyde, furfural, etc.; modified phenolic resins of which a great many are known may also be used as extender resins according to this invention. Typical modifying agents include rosin, rosin esters, polybasic acid esters, etc. These are generally heat curing resins.

GROUP C

This group of resins are generically known as the furane resins. They are generally derived from furfural or furfuryl alcohol. They may be formed by resinification of furfuryl alcohol; by reacting formaldehyde with unsaturated aldehyde having a terminal furyl group, such as furylacrolein, furylpentadienal, etc.; or by condensing furfuryl alcohol with phenol or phenolic resins. A large variety of other resins of this group are known and the above are intended to be merely representative. These too are generally thermosetting resins.

GROUP D

This group comprises high polymers of vinyl compounds such as the polymers of vinyl chloride and vinyl acetate among which Bakelite Corporation's VYHH, VMCH and VAGH are typical. These also include copolymers of polyvinylalcohol and/or polyvinylchloride and the like, with modifying agents including polybasic acids or anhydrides (VMCH) etc. Many of these are thermoplastic resins and those which are particularly useful have high fusion points. Particularly suitable resin is VYNV-1, a very high molecular weight, high vinylchloride-content copolymer of vinylchloride and vinylacetate.

GROUP E

The urea-formaldehyde resins, which are thermosetting resins, may be used, providing they conform to the above specifications, for an extender resin. Among these are various Uformite resins of the Rohm & Haas Co. These are basically condensation products of urea and formaldehyde. These may also be modified by condensing urea, formaldehyde and aliphatic alcohol with 4 to 8 or more carbon atoms per molecule.

GROUP F

This group of extender resins are essentially condensation products between a polybasic acid or anhydride and a polyhydroxyalcohol such as glycerol. An example of these are phthalic alkyds, phthalic alkyd-glycerol, phthalic alkyd-pentaerythritol, maleic anhydride-glycerol or glycol, maleic alkyd pentaerythritol, and such alkyds modified by, for example, rosin esters or fatty acids, e. g., modified glyptols.

GROUP G

This group comprises the high molecular weight resins formed by condensing melamine-urea melamine-formaldehyde, or melamine, formaldehyde and urea. Melamine resins modified by various esterifying compounds such as higher alcohols, for example octyl, may be used.

Any other type of extender resin which is found to conform to the above listed characteristics may also be used. Mixtures of any of the above resins which conform to the aforementioned characteristics may be used providing, however, that they are compatible with each other as well as with the polyhalocarbon resin. The choice of the extender resin depends to a large extent upon the surface which is expected of the final coating. While the principal protection is afforded by the polyhalocarbon resins, it is desirable that the extender resin also possess corrosion resisting characteristics since the overall effectiveness of the finished coating for any given service will be improved thereby. Thus, certain types of resins among those listed have good corrosion resisting properties under certain conditions of service but are poor under other conditions, and the choice is made accordingly.

The mixtures of resins comprising the coating compositions of this invention, can be made in one of several ways. Since the polyhalocarbon resins are insoluble they must be reduced to very fine particle size to produce the desired suspension, the particles generally being from 0.1 to 3 microns. In certain instances solid extender resin and polyhalocarbon resin can be mixed in the desired proportions and the mixture milled with the suspending agent. In many instances it is more practical to prepare separate suspensions of polyhalocarbon resin and solutions of the extender resin, and mix them in the desired proportions either before or at the time of use. This is particularly true when multiple coatings of progressively increasing polyhalocarbon resin content are to be applied. In the event the extender resin is soluble in a suspending or dispersing agent which is compatible with the polyhalocarbon resin suspensoid, a solution can be made of the former and this can be mixed with a suspension of the polyhalocarbon resin. The exact choice of methods is dependent upon the circumstances of use but as long as a stable suspension of the mixed resins is produced the method of combining is not important.

In certain instances mixtures of unlike extender resins are used, for example, an Epon with a phenolic or modified phenolic resin. These must be compatible with each other as well as with the polyhalocarbon resin. The proportions of the mixed extender resins must be within the range in which they are compatible with each other as well as with the polyhalocarbon resin. These ranges vary with different resins, and since this information is available as to the compatibility of various types of the extender resins, it need not be discussed in detail.

In some instances it is desirable to add a plasticizer for the extender resin, these being well known for the various useful types. The polyhalocarbons may be used in unplasticized form, or may be plasticized by means of polyhalocarbon oils or waxes of lower molecular weight than the polyhalocarbon resins.

The final suspension of polyhalocarbon resin and extender resin may be applied in any known manner. For many types of service, such as coating the inside of pipes, reaction vessels, fume ducts, storage tanks, vats and the like, where only one surface is coated, the suspension may be sprayed or brushed on. In other cases, particularly where all surfaces are to be coated and when the article is small enough, it may be dip-coated. In any event the proportion of total resin to suspending agent will be modified to give a mixture of suitable consistency for the desired method of application. Thinners or diluents may be added to adjust the consistency, for example, aromatic or aliphatic hydrocarbons, including naphthenes; ketones, alcohols, esters, etc. Usually a relatively concentrated suspension containing, for example, up to 50% of suspended resins may be made up and a thinner added if required to cut down the viscosity. Suitable fillers and pigments may be added in the usual manner as required, either at the time the suspensoids are made, or at a later stage.

In coating an article, the surface is conditioned so that the extender resin will form a strong bond. It may be cleaned in the usual manner to remove dirt, oil, scale and the like which might interfere with a good bond. This may be done by any known method. In some cases the surface may be sandblasted or etched with acid to produce a slightly roughened surface. A coat containing a primer suitable for use with the extender resin, may be applied before applying the first coat of the composition of this invention. While priming coats are not always required, it is well known that improved bonds can be obtained in many instances between the surface to be coated and the coating film, when employing many of the types of resins which may be used as extender resins in this invention.

In some instances it is advantageous to apply one or more (e. g. 1 to 6 or more) coats of a baking resin having good flow-out characteristics, and possessing at least some degree of corrosion resistance in and of itself. This is preferably but not necessarily the extender resin used in the composition with which the ultimate protective coating is to be formed. In order to form a bond between the film thus formed, and the succeeding coats of compositions of this invention, these base coats are preferably pre-baked at a temperature and for a time less than that required to cure them. A first coat of the composition of this invention is then applied and pre-baked at or above the fusion point of the polyhalocarbon resin.

By following this procedure, it has been found that when the first coat of higher polyhalocarbon resin content is applied to the unpolymerized initial layers and this is followed by a pre-bake at the fusion temperature of the polyhalocarbon resin, the extender resins in the two layers copolymerize or cure, which may be accompanied by cross-linkage and a molecular rearrangement resulting in a single homogeneous non-laminated coat, in which the dispersed polyhalocarbon resin particles are entrapped. When succeeding layers of the composition of this invention are applied, entrapped particles adjacent the surface fuse to particles in the adjoining added layer. In this way a monolithic structure is formed wherein are physically entrapped, particles of polyhalocarbon resin which are fused together to form a three dimensional network or lattice, anchored to the base surface through the medium of the extender resin.

If the surface to be coated comprises a cured resin of the non-halocarbon type, the surface may be roughened by sanding or sandblasting and compositions of this invention can be applied in the same manner as for other types of surfaces as herein described.

The first layer of my composition is applied in a relatively thin coat of the order of 1 mil more or less (dry film thickness), the suspending agent or thinner is evaporated under slightly elevated temperatures not above 200° F. if necessary and the article is pre-baked for about 10–20 minutes. The temperature of the pre-bake of the initial coat is preferably below that at which polymerization or thermosetting of the extender resin occurs, when the film contains less than about 25% polyhalocarbon. If larger proportions of polyhalocarbon are present, the bake temperature should be at or above the fusion point of the polyhalocarbon.

Although a single initial coat may be applied, I have found it advantageous to apply several coats, say two to six, of the same composition as that of the initial coat. When this is done the pre-bake operation is carried out between coats as just described for the initial coat.

When the desired initial coat or coats have been built up in this manner, one or more additional coats comprising up to 95% but preferably 25% to 70% of polyhalocarbon resin and 75% to 30% of extender resin are applied. Each of these coats is dried and pre-baked at a temperature of about the fusion point of the polyhalocarbon resin before application of the succeeding coat. The temperature of pre-baking ranges from 400° to 750° F., depending on the polyhalocarbon resin used. For proportions of polyhalocarbon resin below about 70% a time of about 10–20 minutes is used, but for those containing more than 70% the time is increased, being about 30–40 minutes.

One or more additional coatings containing increasing proportions of extender resin may then be applied, each coat being given a pre-bake of 10–20 minutes at or above the fusing point of the polyhalocarbon resin but below that at which the extender resin deteriorates. As the proportion of polyhalocarbon resin increases, the number of points at the interface between succeeding layers at which the polyhalocarbon resin can fuse together increases tremendously, so that regardless of whether the extender resin bonds well to the cured extender resin, a complete bond is formed by fusion of the polyhalocarbon resin particles to each other. As the number of particles of polyhalocarbon resin increases in successive coatings, the particles tend to fuse together, not only in a vertical direction, that is, between the successive layers, but in a horizontal direction as well, thereby increasing the toughness of the bond between layers.

A further series of coatings, usually one to four in number, containing 70% to 95% of polyhalocarbon resin, and usually of the order of 70% to 85%, is then applied in a like manner. Pre-bake temperatures at or above the melting point of the polyhalocarbon resin are used between coats, and the time is generally 10–20 minutes. Over this is applied from two to six coats, or more if desired, of polyhalocarbon resin containing no extender resin. Each of these coatings is likewise baked out at above the fusion point of the polyhalocarbon resin, the time being increased for the pre-bakes between coats to about 30 to 40 minutes.

After the final coat of 100% polyhalocarbon resin has been applied, the article is given a final-bake for a period of about two to four hours. The final-bake temperature employed depends upon several factors including thickness of the coating, and the fusion temperature of the polyhalocarbon resin employed. If trifluorochloroethylene is used, a final-bake temperature of about 480° to 500° F. for two to four hours is employed when using coatings of 8 to 15 mils thickness over relatively light gauge metals.

The composite coating formed by this method not only has all of the advantages of the pure polyhalocarbon resin coating but the disadvantages heretofore discussed have been eliminated. It has been found that the composite coating effectively covers rough weld seams and other irregular surfaces. Crevices, apertures, seams, overlaps, sharp edges and corners are readily covered without "crawling" or mud-cracking. The initial coats containing the lesser amounts of polyhalocarbon resin form good bonds and flow out readily, providing the extender resin, the proportions of components and the consistency of the composition is properly selected. By building up the composite coat by multiple application of coats containing progressively increasing amounts of polyhalocarbon resin, a positive bond is obtained, not only to the article itself, but throughout the entire cross-section without lamination or tendency of the final 100% polyhalocarbon resin layer to pull away. Mud-cracking is minimized by use of the modified formulation in the manner described, so that a thick composite coat can be built up with fewer applications, since thicker individual coats can be applied than can be done with the polyhalocarbon resins themselves. It has been found that loss of coating resulting from over-spray is greatly reduced. Likewise mist formation is reduced which results in more uniform films and less rough areas. It has been found that the period for pre-bakes and for the final-bake is substantially reduced. The time for pre-baking and final-baking will, of course, vary somewhat depending upon the polyhalocarbon resin and the extender resin employed, but these are generally less than for pure polyhalocarbon resin films of comparable thickness.

The tendency toward creeping and lifting at any point of break, for which the polyhalocarbon resins are notorious, is substantially eliminated. Composite polyhalocarbon resin films of this invention have been applied, scored and kept in a hot solution of chlorine dioxide for more than four months with no tendency toward creepage or lifting of the film. Similar results have been obtained with hot nitric acid solutions, fuming nitric acid, acetic acid, mineral acids, hot and cold alkali solutions, and other corrosive materials. Similarly scored panels coated with polyhalocarbon resin alone fail under similar conditions in a matter of a few hours.

My explanation for the improved results is as follows: When the initial coat of extender resin with a small amount of polyhalocarbon resin is applied, the minute particles of the polyhalocarbon resin are evently and widely scattered through the extender resin and do not substantially interfere with the strong bond between the surface and the extender resin. As I visualize it, a three-dimensional lattice or network of polyhalocarbon resin is built up which is physically anchored in a continuous phase of extender resin, becoming more complex and tougher as the proportions of the polyhalocarbon resin increases in succeeding layers. First, there are scattered individual particles, some of which have fused to other particles at the interface with the next coat. These in turn fuse to other particles and groups of particles in the next layer. This continues until, in the outer layer of low extender content, the network is so complex that the pure polyhalocarbon resin has an infinite number of points to which it can fuse and be held so strongly that it cannot be detached.

The coatings may be applied to any type of surface to be coated such as iron, steel, ferrous alloys, aluminum, copper, and the like as well as stone and ceramic ware and, as previously indicated, to plastic ware provided it will withstand the baking temperature. They are used to protect pipes, valves, reaction vessels, fume ducts, fittings, wire, etc., from the corrosive action of solutions or gases, acids, alkalies, salts and the like such as may be encountered in the chemical and paper industries, petroleum refineries, oil fields, etc., wherein the temperature conditions are not in themselves destructive of the resins.

The compatibility of the extender resins and the polyhalocarbon resin can often be determined by visual inspection of mixtures of dispersions and/or solutions of the two types of resin in the proportions it is desired to use them, and containing any pigments or fillers that are to be added. The mixtures may be sprayed on a panel and then inspected for separation. For films which have passed these tests, a further useful test for determining compatibility is to form test panels by applying one or more and preferably at least two to four coats of the mixtures and baking the panel between each coat at a temperature above the melting point of the polyhalocarbon resin. Do not apply the final 100% polyhalocarbon resin coating. The panels thus prepared are baked out and are partially immersed in a solution containing 10 to 15 milligrams of chlorine dioxide per liter and heated to a temperature of about 150° F. for a period of 8 to 12 hours. If the mixtures are incompatible the panel will develop a readily discernible mottled appearance showing that separation has occurred. If the mixtures are compatible the appearance of the coating is uniform in appearance, although it may undergo a change in color. It is important that the panel be completely coated and the coating be free of breaks or pin holes, since if there is bare metal exposed to the solution, the resulting corrosion products may give a false impression.

In the specification and claims the values given for proportions of extender resin and polyhalocarbon resin, are based upon total resin content of composition, exclusive of pigments, fillers and/or suspending agents, solvents, thinners, etc. which may also be used. The values therefor represent the ratios between one type of resin and the other. Unless otherwise indicated these ratios or percentages are by weight.

The following comprise examples of typical formulations which I have found useful in compounding the compositions of this invention.

*Polyhalocarbon resin dispersion*

Dispersion D–1 (1 gallon) (M. W. Kellogg Co., Kel–F dispersion):
  Trifluorochloroethylene _____lbs__   4
  Particle size _____microns__  0.1–3
  Xylene _____lbs__  6
  Baking temperature_____° F__ 460–500

*Extender resin dispersion*

E–1 Epon resins: Lbs.
  Epon 1007 [1] _____ 4.0
  Chrome oxide_____ 1.2
  Acetone _____ 0.8
  Butyl Cellosolve [2] _____ 4.0

See footnotes at bottom of column 10.

E-2 phenolic resins plus vinyl-aldehyde resin:
　Phenolic R 108 ³ (phenol formaldehyde) ____ 5.0
　Butvar ⁴ (poly vinylalcohol-butyraldehyde) ___ 0.5
　Chromeoxide _____ 1.2
　Toluene _____ 0.4
　Acetone _____ 0.4
　Phosphoric acid _____ 0.25

E-4 Furane resins:
　Furane #1 _____ 5
　Acetone _____ 3
　Chrome oxide _____ 1.2
　$H_2SO_4$ in alcohol (optional) _____ 0.12

*Mixed extender resins:*

E-5 vinyl plus urea formaldehyde resins:
　VAGH ⁵ (vinylchloride-acetate resin) _____ 1.5
　Uformite ⁶ (urea-butanol-formaldehyde) ____ 2.0
　Diisobutyl ketone _____ 4.0
　Acetone _____ 1.0
　Chrome oxide _____ 1.2

VMCH ⁷, a vinyl chloride-acetate-maleic anhydride resin or VYNV ⁵, a vinylchloride-acetate resin may be used in the above formulation in the proportions given for VAGH ⁵.

E-6 Epon plus phenolic plus vinyl-aldehyde resins:
　　　　　　　　　　　　　　　　　　　　　　　　Lbs.
　Epon 1007 ¹ _____ 2.5
　Phenolic R 108 ³ _____ 2.5
　Butvar ⁴ _____ 0.25
　Butyl Cellosolve ² _____ 2.5
　Chrome oxide _____ 1.2
　Toluene _____ 0.4
　Acetone _____ 0.4
　$H_3PO_4$ _____ 0.15

E-7 Epon plus phenolic resins:
　Epon 1007 ¹ _____ 2.5
　Phenolic P-97 ⁸ _____ 2.5
　Chrome oxide _____ 1.2
　Butyl Cellosolve ² _____ 2.5
　Acetone _____ 0.8

E-10 Furane plus phenolic resins:
　Furane #1 _____ 2.5
　Phenolic P-97 ⁸ _____ 2.5
　Xylene _____ 2.5
　Acetone _____ 0.8
　Chrome oxide _____ 1.2

E-12 Furane plus Epon resins:
　Furane #1 _____ 2.5
　Epon 1007 ¹ _____ 2.5
　Acetone _____ 1.5
　Butyl Cellosolve ² _____ 1.5
　Chrome oxide _____ 1.2

E-13 vinyl plus urea formaldehyde plus Epon resins:
　VAGH ⁵ _____ 1.5
　Uformite 210 ⁶ _____ 1.0
　Epon 1007 ¹ _____ 1.0
　Diisobutyl ketone _____ 3.0
　Acetone _____ 1.0
　Butyl Cellosolve ² _____ 1.0
　Chrome oxide _____ 1.2

In the above formula a like amount of phenolic P-97 or Furane #1 may be substituted for Uformite 210.

E-14 urea formaldehyde plus Epon resins:
　　　　　　　　　　　　　　　　　　　　　　　　Lbs.
　Uformite F 210 ⁶ _____ 2.0
　Epon 1007 ¹ _____ 0.8
　Butyl Cellosolve ² _____ 0.8
　Acetone _____ 5.0
　Chrome oxide _____ 1.0

See footnotes at bottom of column 10.

The following compositions were made up using each of the above formulations to which was added dispersion D-1 in an amount to yield the designated proportion by weight of the polyhalocarbon resin to extender resin based on the total resin content.

| Composition No. | Percent Trifluorochloroethylene | Extender Resin |
|---|---|---|
| 1 | 5 | 95 |
| 2 | 20 | 80 |
| 3 | 40 | 60 |
| 4 | 60 | 40 |
| 5 | 80 | 20 |
| 6 | 95 | 5 |

Clean test panels of mild steel were successively spray-coated with two 1 mil coats each of the above compositions, beginning with composition No. 1 (dry film basis). The panels were dried for ten minutes at 150° F., and then pre-baked at 485° F. for ten minutes before application of the next coat. Four 1 mil coats of dispersion D-1 were then applied, the panel being dried and then pre-baked at 485° F. for 30-40 minutes between each application. After application of a final coating of dispersion D-1 the panel was given a final-bake at 485° F. for two hours. The resulting composite coat was 14-18 mils thick.

The resulting panels were then given one or two score marks with a knife point until the metal was exposed. The panels were exposed to a chlorine dioxide solution (10-15 mg. $ClO_2$/liter) at 150° F. and then examined at 12 hour intervals to ascertain whether the film lifted at the point of scoring. Although the metal exposed by scoring was corroded, there was no evidence of film failure or corrosion at any other point. Even immediately adjacent the score mark the film retained its bond.

Panels coated with dispersion D-1 without any extender resin failed completely in less than 12 hours under similar conditions, the solution creeping between the film and the metal surface in both directions from the score mark so that film could be lifted off. The underlying metal was badly corroded.

Similar tests were made using fuming nitric acid solution at 70° F. The scored polyhalocarbon panels failed in a similar manner but the panels coated according to this invention remained intact, bonded to the metal, and showed no signs of creeping or failure of bond.

Many of the compositions have been tested in like manner in alkaline solutions at various temperatures with similar good results.

The formulations presented are for purposes of illustration and intended to guide those skilled in the art. It is clear that an infinite variation in formulations can be made.

A more specific illustration of a coating designed to withstand the most severe corrosion conditions, such as contact with fumes and solutions of chlorine dioxide at

---

¹ "Epon 1007" is a trademark of the Shell Chemical Corporation for a normally solid high molecular weight epoxy resin which is the condensation polymer of epichlorhydrin and bisphenol.
² "Butyl Cellosolve" is a trademark of the Union Carbide Chemicals Company for ethylene glycol monobutyl ether.
³ "Phenolic R-108" is the trademark of the General Electric Company, for a thermosetting high molecular weight allyl-oxy-phenol-formaldehyde resin.
⁴ "Butvar" is the trademark of the Monsanto Chemical Company for a normally solid high molecular weight condensation polymer of polyvinyl alcohol and butyraldehyde.
⁵ "VAGH" and "VYNV" are trademarks of Bakelite Corporation for normally solid high molecular weight condensation polymers of vinyl chloride and vinyl acetate.
⁶ "Uformite 210" is a trademark of Rohm & Haas Corporation for high molecular weight condensation product of urea and formaldehyde supplied in xylol-butanol solution.
⁷ "VMCH" is a trademark of the Bakelite Corporation for a normally solid high molecular weight condensation polymer of vinyl chloride, vinyl acetate and maleic anhydride.
⁸ "Phenolic P-97" is a trademark of Monsanto Chemical Co. for a high molecular weight condensation polymer of phenol and formaldehyde.

relatively high temperatures as is sometimes encountered in the paper industries, for example, is as follows:

A dispersion was made by mixing dispersion D-1 with formulation E-7 in proportions to produce a composition wherein the ratio of polyhalocarbon to extender resins was 65:35. Eight successive coatings of approximately 1 mil thickness were sprayed on mild steel and stainless steel, the panels being dried and pre-baked for 15 to 20 minutes at 480° F. between coats. A second dispersion was made by blending the same two formulations wherein the ratio of the polyhalocarbon resin to the extender resin was 85:15. Two coats of this dispersion were then applied to the panels with drying and pre-baking between coats as previously described. Six coats of approximately 1 mil thickness of dispersion D-1 were then successively applied with drying followed by prebaking at 480° F. for a period of 30 to 40 minutes between coats. After addition of the final coat the panels were baked for two hours at 485° F. The coatings thus produced are extremely tough and could be scored with a knife point only by application of strong pressure. The bond to the panels was strong. The coating could be chipped from the panels with a chisel but could not be pulled away. The upper layers of 100% polyhalocarbon resin were strongly bonded to the under layers with no evidence that they could be removed except by chipping. This is in contrast to metal panels coated with the pure polyhalocarbon resin. Such films can readily be penetrated with a knife point and when this is done there is immediate evidence of lifting of the film from the panel at the point of the cut. If a small part of the pure polyhalocarbon film applied directly to the metal is detached, the entire coating can be removed with a slight pull. Of course, such polyhalocarbon resin films will resist corrosion indefinitely and will protect the metal providing there is no break or pin holes in the film. But when a break occurs the very slight bond between the film and the metal is rapidly destroyed and the metal is attacked over a large area.

The following is an example of a film that may be used where the corrosion resisting requirements are somewhat less severe, such as may be encountered with salt solutions, dilute alkali or dilute acid at normal room temperature or below. Steel panels were cleaned and six successive layers of formulation E-7 were applied. The panels were dried and pre-baked at a temperature of about 350° F. for 10 to 20 minutes between each coating. A mixture of dispersion D-1 and E-7 was then made wherein the ratio of polyhalocarbon resin to extender resin was about 30:70. Four coats of this mixture were applied successively with drying followed by pre-baking at 485° F. for about 15 minutes. This was carried out between coatings. A second mixture comprising about 70% of the polyhalocarbon resin and 30% of the extender resin was made and six coats of this were applied employing a similar schedule of drying and pre-baking between coatings. This composition was then baked out for two hours at 485° F. The resulting coat was tough and adherent. Because of lesser requirements for corrosion resistance, it was found that this coat would withstand service in contact with acetic acid at about 100° F. for periods of four months without evidence of failure. Some panels were made in a like manner wherein the 100% polyhalocarbon resin final coatings were applied. These were, of course, even more effective. Compositions of this character, that is, those containing relatively high proportions of extender resin in the composite coat are far less expensive than compositions containing higher proportions of the polyhalocarbon resin and are therefore chosen where the service conditions permit.

Another type of coating which is particularly advantageous where severe corrosion problems are encountered and where improved electrical resistance and increased strength is desired is as follows:

Dispersion D-1 and formulation E-7 were mixed in proportions to produce a composition having the ratio of polyhalocarbon resin to extender resin of 60:40. Two successive coats of approximately 1 mil thickness each were sprayed on a sandblasted steel panel, the panel being dried and pre-baked in the manner described in the foregoing example. A single coat of 100% polyhalocarbon resin was then applied, dried and baked for thirty minutes at 480° F. Two additional coats of the 60:40 mixture were then applied, another coat of the 100% polyhalocarbon resin was then applied and two additional coats of the mixed resin applied thereafter. The coating was built up until a total of 12 coats had been applied in this alternating fashion, and then three coats consisting of polyhalocarbon resin were applied. Thus the third, fifth, seventh, ninth, eleventh and thirteenth to sixteenth coats inclusive, consisted of the 100% polyhalocarbon resin. The mixed resin coatings were pre-baked between applications for 15 minutes at 480° F. The polyhalocarbon coats were pre-baked 30 to 40 minutes each. The final coating was baked for two hours at about 480° F. The panel was tested by exposure to the chlorine dioxide solution and to fuming nitric acid as previously described. The composite coat possessed greater physical strength, better corrosion resistance and greater electrical resistance than any of the coatings tested. It appears that the intermediate coats of the polyhalocarbon resin were responsible for these improvements.

The composite coating compositions of this invention can advantageously be applied to fabrics which will withstand the baking temperatures required. These include glass-fabric, asbestos-fabric, metal-fabric and the like. Coatings similar to those described can be advantageously applied to one side of the fabric to build up a composite coat of from 10 to 15 mils thickness more or less and the other side of the fabric can be coated with an adhesive whereby the resulting composition can be applied to surfaces such as the interior of tanks to protect them from corrosion. When using a dispersion such as D-1 on glass-fabric, attempts to coat one side of the fabric have failed. The particles of polyhalocarbon resin in the dispersion penetrate entirely through the fabric. This is because of the poor covering qualities of the dispersions previously referred to. As a consequence the adhesive cannot be applied.

However, by applying one or more initial coats of extender resin having good covering qualities, or of mixtures such as extender resin and polyhalocarbon resin, penetration of the fabric is negligible and does not interfere with the application of the adhesive to the opposite side. The composite coat can then be built up in the manner previously described. The usual prebakes and final-bake is, of course, used.

This application is a division of my copending application Serial No. 409,267, filed February 9, 1954, now United States Patent No. 2,777,783

I claim as my invention:

1. A coating composition comprising a uniform nonaqueous-liquid dispersion of particles of a normally solid fusible polyhalocarbon resin of about 0.1 to about three micron size, the halocarbon monomer from which said resin is formed being a halogen subtituted low molecular weight hydrocarbon selected from the group consisting of unsaturated aliphatic and unsaturated alicyclic hydrocarbons in which the hydrogen atoms are entirely substituted by halogen atoms, at least one of which is fluorine and at least one of which is a halogen other than fluorine, said monomer having an ethylenic bond in the molecule, and a film forming synthetic extender resin other than a polyhalocarbon resin, said extender resin when applied to a substrate and upon being heated to the temperature and for the time necessary to fuse the polyhalocarbon resin, having good spreading and flowout characteristics, forms a uniform coherent film tenaceously adhering to the substrate without decomposing or volatilizing, the dispersed polyhalocarbon resin particles being homogeneously distributed throughout said film, the dispersing medium being a volatile organic liquid solvent for the extender resin and being present in an amount to form a compatible liquid dispersion of said resins, the polyhalocarbon resin comprising about 5% to about 70% by weight and the extender resin comprising about 95% to about 30% by weight of the total of said resin components in said composition.

2. The composition of claim 1 in which the extender resin is a thermosetting resin.

3. The composition of claim 1 wherein polyhalocarbon resin is a normally solid polymer of trifluorochloroethylene having a fusion point above about 400° F.

4. The composition of claim 3 wherein polyhalocarbon resin comprises from about 25% to about 70% and the extender resin comprises from about 75% to about 30% by weight of the total resin content.

5. The composition of claim 3 wherein the extender resin comprises a mixture of condensation polymers of epichlorhydrin and bisphenol, and a thermosetting condensation product of a phenol and an aldehyde.

6. The composition of claim 3 wherein the extender resin comprises a thermosetting condensation product of urea and an aldehyde.

7. The composition of claim 3 wherein the extender resin comprises a furane resin.

8. The composition of claim 3 wherein the extender resin comprises a condensation polymer of epichlorhydrin and bisphenol.

9. The composition of claim 3 wherein the extender resin comprises a condensation product of a polyhydroxy alcohol and a compound selected from the group consisting of a polycarboxylic acid and a polybasic anhydride thereof.

References Cited in the file of this patent
UNITED STATES PATENTS

| | | |
|---|---|---|
| 2,497,046 | Kropa | Feb. 7, 1950 |
| 2,644,802 | Lontz | July 7, 1953 |
| 2,681,324 | Hochberg | June 15, 1954 |
| 2,718,452 | Lontz | Sept. 20, 1955 |
| 2,719,833 | Vincent et al. | Oct. 4, 1955 |
| 2,777,783 | Welch | Jan. 15, 1957 |
| 2,789,960 | Smith | Apr. 23, 1957 |